W. V. TURNER.
LOCOMOTIVE BRAKE.
APPLICATION FILED SEPT. 14, 1910.
1,039,221.
Patented Sept. 24, 1912.
2 SHEETS—SHEET 1.
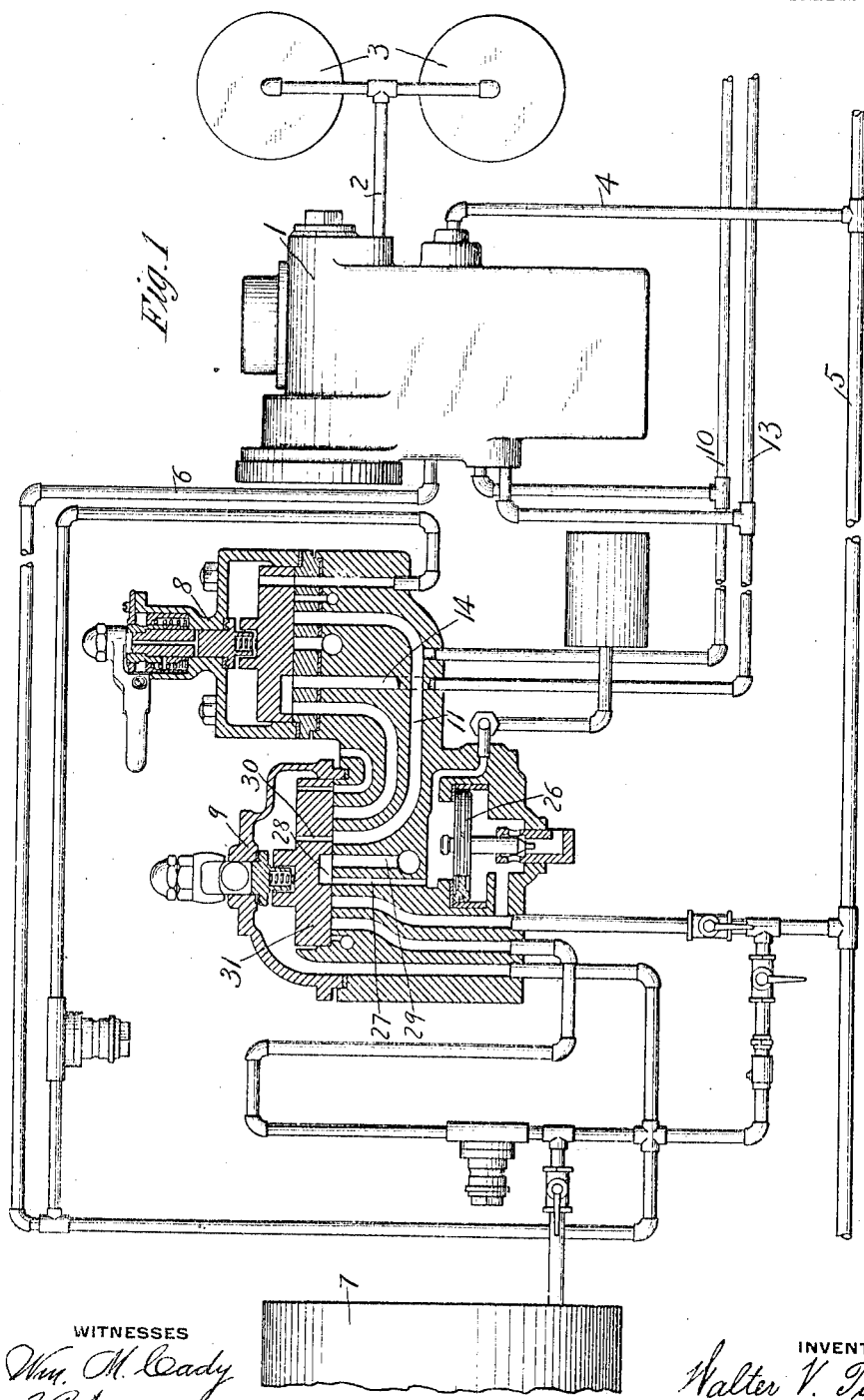
WITNESSES
INVENTOR
Walter V. Turner W. V. TURNER.
LOCOMOTIVE BRAKE.
APPLICATION FILED SEPT. 14, 1910.
1,039,221.
Patented Sept. 24, 1912.
2 SHEETS—SHEET 2.
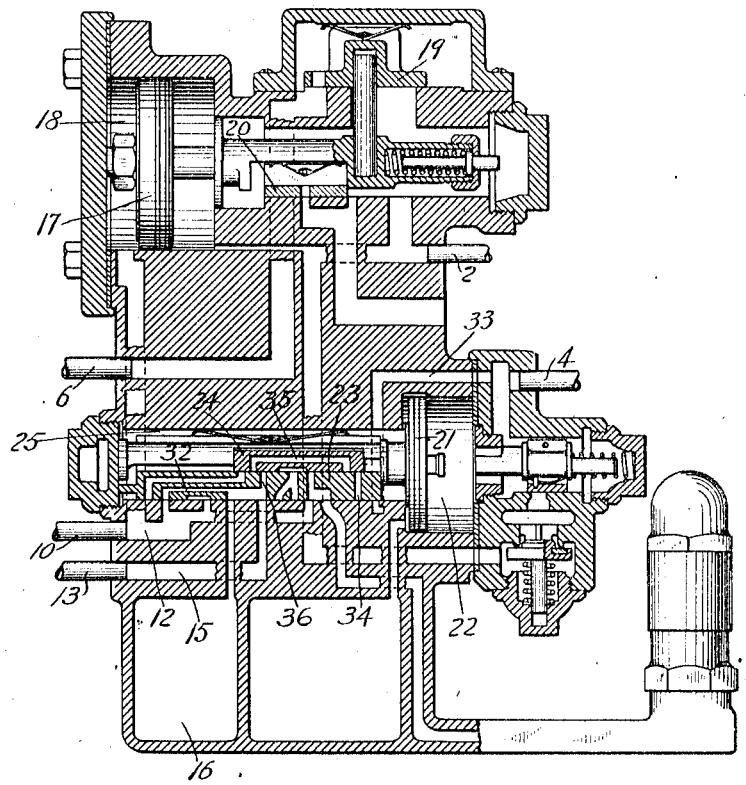
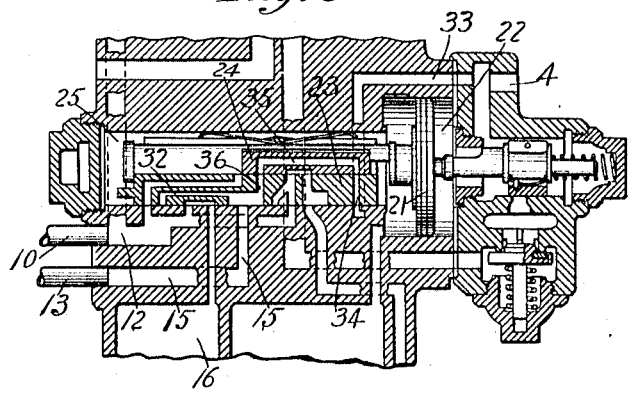
WITNESSES
INVENTOR
Walter V. Turner
by E. H. Wright Att'y.

UNITED STATES PATENT OFFICE.

WALTER V. TURNER, OF EDGEWOOD, PENNSYLVANIA, ASSIGNOR TO THE WESTING-HOUSE AIR BRAKE COMPANY, OF PITTSBURGH, PENNSYLVANIA, A CORPORATION OF PENNSYLVANIA.

LOCOMOTIVE-BRAKE.

1,039,221.  Specification of Letters Patent.  Patented Sept. 24, 1912.

Application filed September 14, 1910. Serial No. 582,095.

*To all whom it may concern:*

Be it known that I, WALTER V. TURNER, a citizen of the United States, residing at Edgewood, in the county of Allegheny and State of Pennsylvania, have invented new and useful Improvements in Locomotive-Brakes, of which the following is a specification.

This invention relates to fluid pressure brakes, and more particularly to a brake equipment for locomotives and other vehicles.

The present invention is in the nature of an improvement in connection with the locomotive brake apparatus known as the ET locomotive brake equipment, such as described, for example, in The Westinghouse Air Brake Company's instruction pamphlet No. 5032, dated October, 1907.

Briefly described, the above equipment comprises valve means for supplying and releasing air to and from the locomotive brake cylinders, an application chamber, a movable abutment subject to variations in pressure in the application chamber for operating said valve means, an automatic valve device operated by variations in train pipe pressure for controlling the fluid pressure in said application chamber, an automatic brake valve for varying the train pipe pressure, and an independent brake valve for directly supplying and releasing air to and from the application chamber.

In the application of an equipment of the above character to electric locomotives and other vehicles, where brake valves are provided at both ends of the vehicle for controlling the brakes, the direct application and release pipe and the automatic release pipe from the exhaust port of the automatic valve device extend from the brake valves at each end of the vehicle to the distributing valve device, so that said pipes are of considerable length and volume.

The increased volume of the above mentioned pipes is liable in some cases to affect the operation of controlling the brakes, for example, if it is desired to release the train brakes while holding the engine brakes applied after an automatic service application of the brakes, the train pipe pressure is increased to move the triple valves to release position. The automatic valve portion of the distributing valve also moves to release position under this increase in train pipe pressure, connecting the automatic release pipe with the application chamber. As this pipe is closed at the brake valve in the engine brake holding position, no air is exhausted to the atmosphere, but owing to the length of the pipe, there is liable to be reduction in pressure in the application chamber by reason of the equalization thereof into said pipe. This reduction may then cause a partial release of the engine brakes. Also, in making an automatic service application of the brakes, the direct application and release pipe being in communication with the application chamber, fluid supplied to said chamber must also equalize into the volume of said pipe. It will thus be evident that there is a tendency to reduce the pressure obtained in the application chamber for a given reduction in train pipe pressure according to the volume of the pipe.

The principal object of my invention is to obviate the above difficulties, and for this purpose, the invention consists in providing means for supplying fluid under pressure to the above mentioned pipes upon making an automatic service application of the brakes.

In the accompanying drawings; Figure 1 is a diagrammatic view of a locomotive brake equipment with the brake valve portion shown in section, showing my improvement applied thereto; Fig. 2 a central sectional view of the distributing valve device, showing the parts in release position; and Fig. 3 a sectional view of the automatic valve portion of the distributing valve device, showing the parts in automatic service application position.

As shown diagrammatically in Fig. 1, the locomotive brake equipment may comprise a distributing valve device 1 connected by pipe 2 to the locomotive brake cylinders 3, by branch pipe 4 to train pipe 5, and by pipe 6 to the main reservoir 7. A combined automatic and direct brake valve device is provided at each end of the locomotive having a direct brake valve portion 8 and an automatic brake valve portion 9, the brake valve device for one end only being shown in the drawing. A direct application and release pipe 10 extends to the opposite ends of the locomotive and connects with a passage 11 leading to the rotary valve seats of both the automatic and the direct brake valves at each end of the locomotive and said pipe also connects with a passage 12 in the distributing valve device 1. An automatic release pipe 13 communicates with a passage 14 opening at the seat of the direct rotary valve and with a passage 15 in the distributing valve device.

As shown in Fig. 2, the distributing valve device comprises an application chamber 16, a movable abutment 17 contained in a piston chamber 18, an application valve 19 and a release valve 20, both adapted to be operated by the abutment 17. The distributing valve device also has an automatic valve portion comprising a movable abutment 21, contained in piston chamber 22, and main and graduating valves 23 and 24 contained in valve chamber 25 and adapted to be operated by the abutment 21. In order to make an automatic service application of the brakes the automatic brake valve 9 is turned to service application position, as shown in Fig. 1, in which the equalizing reservoir side of the discharge valve piston 26 is connected by passage 27 and cavity 28 in the rotary valve with exhaust cavity 29 in order to effect a gradual reduction in train pipe pressure in the usual manner.

According to my invention, an additional through port 30 is provided in the automatic rotary valve 31, which is adapted, in this position, to register with passage 11. It will thus be seen that air is being supplied to the direct application and release pipe 10 while the train pipe pressure is being reduced so that said pipe becomes charged with fluid under pressure and air supplied to the application chamber by operation of the automatic valve device for a given reduction in train pipe pressure produces substantially the same pressure in the application chamber as would be obtained without considering the volume of the pipe 10.

According to my invention, in the distributing valve device, an additional passage 33 is provided, which leads from the train pipe branch connection 4 to the seat of the main slide valve 23 and in service application position, as shown in Fig. 3, this passage registers with a through port 34 in the main slide valve. The graduating valve 24 is provided with a cavity 35 adapted to connect the through port 34 with a through port 36 opening into cavity 32, said cavity registering with the automatic release passage 15. The automatic release pipe 13 is thus supplied with fluid under pressure from the train pipe in service applications, and when it is desired to release the train brakes and hold the engine brakes applied, the movement of the automatic valve portion of the distributing valve device to release position, in which the pipe 13 is connected to the application chamber 16, will not operate to effect a reduction in pressure in the application chamber by flow to said release pipe.

It will now be seen that with my improvement both the direct application and release pipe and the pipe communicating with the exhaust of the automatic valve portion of the distributing valve device are supplied with fluid under pressure in making service applications of the brakes, so that no reduction in pressure in the application chamber takes place in releasing the train brakes after an automatic service application while holding the engine brakes applied and also the added volume of the direct application and release pipe does not operate to lessen the degree of pressure obtained in the application chamber for a given reduction in train pipe pressure, in making an automatic service application of the brakes.

Having now described my invention, what I claim as new and desire to secure by Letters Patent, is:—

1. In a fluid pressure brake, the combination with a brake cylinder, of a chamber, a valve device operated by variations in pressure in said chamber for controlling the pressure in the brake cylinder, means for supplying air to said chamber, a direct pipe for also supplying air to said chamber, and means for supplying air to said pipe upon supplying air to said chamber.

2. In a fluid pressure brake, the combination with a train pipe and brake cylinder, of a valve for controlling the supply of air to the brake cylinder, an application chamber, a movable abutment subject to variations in pressure in said chamber for controlling said valve, an automatic valve device operated by a reduction in train pipe pressure for supplying air to said chamber, a pipe for supplying air directly to the chamber, and a brake valve having a position for effecting a reduction in train pipe pressure and in which air is supplied to said direct supply pipe.

3. In a fluid pressure brake, the combination with a brake cylinder, of a chamber, a valve mechanism operated by variations in pressure in said chamber for controlling the admission and release of fluid under pressure to and from said brake cylinder, a valve device for varying the pressure in said chamber, a pipe for directly releasing air from said chamber, and means for supplying air to said release pipe upon operation of said valve device to vary the pressure in said chamber.

4. In a fluid pressure brake, the combination with a brake cylinder, of a chamber, valve means for controlling the admission and release of fluid under pressure to and from said chamber to control the fluid pressure in the brake cylinder, a movable abutment subject to variations in pressure in said chamber for operating said valve means, a direct application and release pipe through which fluid under pressure is admitted to and released from said chamber, and means for supplying fluid to said pipe when said valve means is operated to supply air to said chamber.

5. In a fluid pressure brake, the combination with a brake cylinder and train pipe, of a chamber, a valve mechanism subject to the pressure in said chamber for controlling the admission of fluid under pressure to the brake cylinder, a release pipe, an automatic valve device operated by variations in train pipe, pressure for supplying air to said chamber and for releasing air from said chamber through said pipe, and means for supplying air to said pipe upon operation of said valve device to supply air to said chamber.

6. In a fluid pressure brake, the combination with a brake cylinder and train pipe, of a chamber, a valve mechanism subject to the pressure in said chamber for controlling the admission and release of fluid to and from said brake cylinder, an automatic valve device operated by variations in train pipe pressure for supplying and releasing air to and from said chamber, a release pipe connected to the exhaust port of said valve device, and means adapted to supply air from the train pipe to said release pipe upon operation of said valve device to supply air to said chamber.

7. In a fluid pressure brake, the combination with a brake cylinder and train pipe, of a chamber, a valve mechanism operated by variations in pressure in said chamber for controlling the admission and release of fluid to and from the brake cylinder, an automatic valve device operated by variations in train pipe pressure for controlling the supply and release of fluid to and from said chamber, a direct application and release pipe, an independent brake valve for controlling the admission and release of fluid to and from said chamber through said pipe, and an automatic brake valve adapted in one position to effect a reduction in train pipe pressure and to supply fluid to said pipe.

8. In a fluid pressure brake, the combination with a brake cylinder and train pipe, of a chamber, a valve mechanism operated by variations in pressure in said chamber for controlling the admission and release of fluid to and from the brake cylinder, an automatic valve device operated by variations in train pipe pressure for controlling the supply and release of fluid to and from said chamber, a release pipe connected to the exhaust of said automatic valve device, a direct application and release pipe, an independent brake valve for supplying and releasing fluid to and from said chamber through said direct application and release pipe, and means operating when the train pipe pressure is reduced to supply fluid to said automatic release pipe and said direct application and release pipe.

9. In a fluid pressure brake, the combination with a brake cylinder and train pipe, of a chamber, a valve mechanism operated by variations in pressure in said chamber for controlling the admission and release of fluid to and from the brake cylinder, an automatic valve device operated by variations in train pipe pressure for controlling the supply and release of fluid to and from said chamber, an application and release pipe through which air is directly supplied to and released from said chamber, and an automatic brake valve device having ports adapted in one position to effect a reduction in train pipe pressure and to supply fluid to said pipe.

10. In a fluid pressure brake, the combination with a brake cylinder and train pipe, of a chamber, a valve mechanism operated by variations in pressure in said chamber for controlling the supply and release of fluid to and from the brake cylinder, valve means for controlling the pressure in said chamber, a movable abutment subject to variations in train pipe pressure for operating said valve means, a pipe connected to the release port of said valve means, and ports controlled by said valve means for supplying fluid to said pipe upon a reduction in train pipe pressure.

11. The combination with a train pipe and a chamber, a variation in pressure in which is adapted to effect an application of the brakes and means operated by a reduction in train pipe pressure for controlling the pressure in said chamber, of a brake valve adapted in one position to effect a reduction in train pipe pressure, a pipe leading from said brake valve to said chamber through which fluid is directly supplied to said chamber, said brake valve being adapted to also supply fluid to said pipe in the position for reducing the train pipe pressure.

In testimony whereof I have hereunto set my hand.

WALTER V. TURNER.

Witnesses:
B. A. OLIVER,
A. M. CLEMENTS.